(12) United States Patent
Gao et al.

(10) Patent No.: US 6,849,282 B2
(45) Date of Patent: Feb. 1, 2005

(54) SOY PROTEIN AS AN EMULSIFIER FOR STARCH-BASED SALAD DRESSING

(75) Inventors: Song Gao, Glenview, IL (US); Wen-Sherng Chen, Glenview, IL (US); Adedayo Olad Doherty, Chicago, IL (US); Reynell Grant, Des Plaines, IL (US); Pernell Showers, Chicago, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 169 days.

(21) Appl. No.: 10/358,912

(22) Filed: Feb. 5, 2003

(65) Prior Publication Data

US 2004/0151805 A1 Aug. 5, 2004

(51) Int. Cl.⁷ .............................. A23L 1/24; A23L 1/211
(52) U.S. Cl. ...................... 426/46; 426/650; 426/634
(58) Field of Search ......................... 426/46, 650, 656, 426/634, 589, 613, 602, 605

(56) References Cited

U.S. PATENT DOCUMENTS

| | | |
|---|---|---|
| 4,144,229 A | 3/1979 | Karnofsky |
| 4,163,808 A | 8/1979 | DePaolis |
| 4,209,541 A | 6/1980 | Clatfelter et al. |
| 4,291,063 A | 9/1981 | Ridgway |
| 4,304,795 A | 12/1981 | Takada et al. |
| 4,322,344 A | 3/1982 | Chen et al. |
| 4,426,395 A | 1/1984 | Sakai et al. |
| 4,431,629 A | 2/1984 | Olsen |
| 4,757,007 A | 7/1988 | Satoh et al. |
| 4,794,015 A | 12/1988 | Fujita et al. |
| 4,908,224 A | 3/1990 | Yoder |
| 5,077,062 A | 12/1991 | Ernster |
| 6,090,432 A | 7/2000 | MeKeown |
| 6,303,177 B1 | 10/2001 | Ning et al. |
| 6,313,273 B1 | 11/2001 | Thomas et al. |
| 6,355,296 B1 | 3/2002 | Altemueller et al. |
| 6,479,083 B1 * | 11/2002 | Han et al. .................... 426/46 |
| 6,780,446 B2 * | 8/2004 | Gao et al. .................... 426/46 |

* cited by examiner

Primary Examiner—Keith Hendricks
(74) Attorney, Agent, or Firm—Fitch, Even, Tabin & Flannery

(57) ABSTRACT

Starch-based salad dressing compositions that utilize soy protein as an emulsifier and the making of such compositions. Soy protein replaces a substantial amount of or all of the egg yolk or whole egg as an emulsifier in the starch-based salad dressing. The soy protein may be untreated, heat or enzyme treated, or may be treated according to other optional treatments. The soy protein is blended with the egg yolk or whole egg (if included), salt, spices, sugar, high fructose corn syrup, and soybean oil to make a premix. A starch base is made separately from water, starch, sugar, and acid. The premix and starch base are then mixed and homogenized to form the starch-based salad dressing composition.

48 Claims, 3 Drawing Sheets

SOY PROTEIN AS AN EMULSIFIER FOR STARCH-BASED SALAD DRESSING

FIELD OF INVENTION

The present invention relates to salad dressing compositions and to methods of making such compositions. More particularly, the present invention relates to starch-based salad dressing compositions that utilize soy protein as an emulsifier and to methods of making such compositions.

BACKGROUND OF THE INVENTION

Soy proteins are valuable food ingredients due to their high nutritional value. The health benefits of soybeans and soy products have been known and well documented for some time. Soybeans and other soy proteins have been widely accepted in Asia for centuries and are one of the principal sources of protein in a traditional Asian diet. Despite this, soy protein has not been as widely accepted for use in food products in the United States, primarily due to consumers' objections to the flavor of soy. In recent years, however, soy-based products have enjoyed a great increase in popularity as people have become more health-conscious.

Soybeans, and soy proteins in general, are a nutrient-rich and inexpensive vegetable protein source with a variety of health benefits. The primary health benefit of soy protein is its ability to lower cholesterol levels. Soy proteins lower total cholesterol and LDL cholesterol ("bad" cholesterol) and decrease blood clotting, which reduces the risk of heart attack and stroke. Soy proteins also provide antioxidants, reduce artery-clogging plaque, improve blood pressure and promote healthy blood vessels, which protect the body from free radical damage, boost the immune system, and lower the risk of atherosclerosis (the hardening of the arteries), heart disease, and hypertension (high blood pressure). In fact, the Food and Drug, Administration (FDA) has granted a Cardiac Vasular Disease (CVD) soy protein health claim for its cholesterol-lowering ability. In addition to a tendency to lower cholesterol levels, soybeans have recently been linked with, or suggested as having a possible role in, inhibiting the development of cancer. Fiber in soy protein materials protects the body from many digestive related cancers, such as colon and rectal cancer, while isoflavones in soy materials may protect the body from hormone-related cancers, like breast, uterine, and prostate cancer. Soy protein also contributes to bone health and longevity by enhancing the body's ability to retain and absorb calcium in the bones, thus reducing effects of osteoporosis. Isoflavones in soy materials also help the body regulate estrogen when the hormone is declining or fluctuating, which helps alleviate symptoms of menopause in women. Additionally, soy protein contains an amino acid profile that is among the most complete of all vegetable protein sources, and resembles, with the exception of the sulfur-containing amino acids, the pattern derived from high-quality animal protein sources. Soy also contains many vitamins, minerals, and phytochemical compounds, such as isoflavones, that work together to create other health benefits. Thus, due to the variety of health benefits of soy protein, efforts have been made to incorporate soy into a wide variety of foods.

Soy protein isolate (SPI), soy protein concentrate (SPC), and soy flour (SF) are major sources of soy protein. Soy protein concentrates and soy protein isolates are the most highly refined commercially available soy protein-containing products. Both soy protein concentrates and isolates are processed to increase soy protein content. Soy protein isolate contains approximately ninety percent or more soy protein by weight, but is also the most expensive of the three major sources of soy protein. Soy protein concentrate contains approximately sixty-five to eighty percent soy protein by weight and has a cost which is intermediate between lower cost soy flour and more expensive soy protein isolate. Soy flour contains about forty-five to fifty-five percent soy protein by weight and is the least expensive of the three major sources of soy protein. Soy flour also has substantial amounts of carbohydrates and relatively small amounts of oligosaccharides (e.g., raffinose and stachyose) which can be removed using an α-galactosidase enzyme.

It is generally desirable to reduce the oligosaccharide content of soy products because raffinose and stachyose oligosaccharides induce intestinal In addition to its health benefits, soy protein is also known to have emulsifier functionality. An emulsifier allows the combination or mixture of two ingredients that normally do not easily mix. Generally, two or more immiscible liquids, such as oil and water, may form an emulsion merely upon shaking, but the emulsion is very unstable and the liquids quickly separate into separate layers. An emulsifier works by coating droplets of one liquid so that the droplets may remain suspended in the other liquid. For example, in salad dressings an emulsifier allows the production of a stable mixture of oil and water, two materials which would normally separate into two separate layers when mixed. It is desirable for an emulsifier to maintain the emulsion for a long period of time without undergoing separation into layers or components. As an emulsifier, soy protein surrounds an oil droplet and allows the droplet to remain suspended in water, thus allowing the formation of a stable oil-in-water emulsion.

Currently, egg yolk and whole eggs are important ingredients used in starch-based salad dressing products (e.g., MIRACLE WHIP™ from Kraft Foods, Northfield, Ill.). The proteins and lecithin in the whole egg or egg yolk function as emulsifiers in the salad dressing. The whole egg or egg yolk stabilize the emulsion droplets, while the gelatinzed starch base stabilizes the aqueous phase in which the spices, sweeteners, and remaining soluble proteins and other electrolytes are suspended. Generally, the content of protein in whole egg and egg yolk are thirteen percent and sixteen percent, respectively. Both whole egg and egg yolk are susceptible to microbial contamination and, thus, whole egg or egg yolk salted with ten percent salt is regularly used in place of pure whole egg or egg yolk. Refrigeration of the salted whole egg or egg yolk is required and, even when refrigerated, the shelf life of the whole egg or egg yolk is relatively short. These factors, as well as the high purchase cost of whole egg and egg yolk emulsifiers, make their use in salad dressings very costly.

In comparison, soy flour is an inexpensive and protein-rich ingredient. Soy flour also does not contain cholesterol and has a variety of health benefits, as discussed above. Additionally, soy flour has a relatively long shelf life. Therefore, utilization of soy protein, especially soy flour, to replace other costly emulsifiers would allow significant cost savings in the production of food products.

The replacement of whole eggs or egg yolk with soy flour in starch-based salad dressing products could result in healthier products and significant cost savings. However, due to the solubility, texture, and flavor problems associated with soy protein, relatively unprocessed soy protein materials, such as soy flour, have not been widely used in food products to date.

Examples of efforts to utilize soy proteins in salad dressings include U.S. Pat. No. 4,163,808 (use of soy proteins as the sole or dominant emulsifier in an imitation mayonnaise and salad dressing); U.S. Pat. No. 4,304,795 (use of soybean protein in a semisolid egg yolk-free dressing); U.S. Pat. No. 4,322,344 (use of a chemically phosphorylated soy protein in a salad dressing); U.S. Pat. No. 4,426,395 (use of a partial hydrolyzate of alcohol denatured soybean protein as an emulsifier); U.S. Pat. No. 4,757,007 (a low solubility hydrolyzed soy protein which has emulsifying properties); and U.S. Pat. No. 6,090,432 (use of tofu as an ingredient in a salad dressing).

SUMMARY OF THE INVENTION

The present invention relates to the use of soy protein to replace a significant portion of egg yolk or whole egg in starch-based salad dressings. The present invention relates to compositions of such starch-based salad dressings and methods of making such compositions. More specifically, the present invention is directed to starch-based salad dressings wherein a substantial amount of the egg yolk or whole egg in the salad dressing is replaced with soy protein. For purposes of the present invention, a "substantial amount" is intended to mean at least about 50 percent, and more preferably about 50 to about 100 percent, of the egg yolk and whole egg is replaced by soy protein.

The present invention provides a starch-based salad dressing and a method for making such a salad dressing utilizing soy protein instead of, or in place of a substantial portion of, conventionally used egg yolk or whole egg. Soy protein, preferably in the form of soy flour, soy protein concentrate, and/or soy protein isolate, is used as an emulsifier in the salad dressing. Generally, the salad dressing of the present invention is as stable and as flavorful as conventional starch-based salad dressings. However, the soy protein is less expensive than the conventional egg yolk and whole egg used in conventional dressings and also provides substantial health benefits to the consumer.

In one embodiment of the present invention, the soy protein source is soy flour. To prepare a soy-containing starch-based salad dressing, the soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to make the salad dressing.

The salad dressing composition is most desirably obtained when soy flour is treated prior to making the compositions to denature a substantial amount of the soy protein and carbohydrates in the starting soy flour. This enhances the emulsifying properties or activates of the soy protein.

In another embodiment of the present invention, the soy protein source is soy flour that has been heat-treated prior to incorporation into the starch-based salad dressing. The soy flour is dispersed in water and heated for a time sufficient to denature a substantial amount of the proteins and carbohydrates. The treated soy flour may be used in various food products. For example, to prepare a soy-containing starch-based salad dressing, the treated soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to form the salad dressing.

In another embodiment of the invention, the soy protein source is a soy protein flour which has been enzyme-treated to hydrolyze at least a portion of the protein (preferably 5 percent or less) prior to its incorporation into the starch-based salad dressing. The soy flour is dispersed in water, treated with an enzyme, and then heated to inactivate the enzyme and denature a substantial amount of proteins and carbohydrates contained therein. The treated soy flour can be used in various food products. For example, to prepare a soy-containing starch-based salad dressing, the treated soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to form a salad dressing composition.

DETAILED DESCRIPTION OF THE PREFERRED EMBODIMENTS

Figure 1:
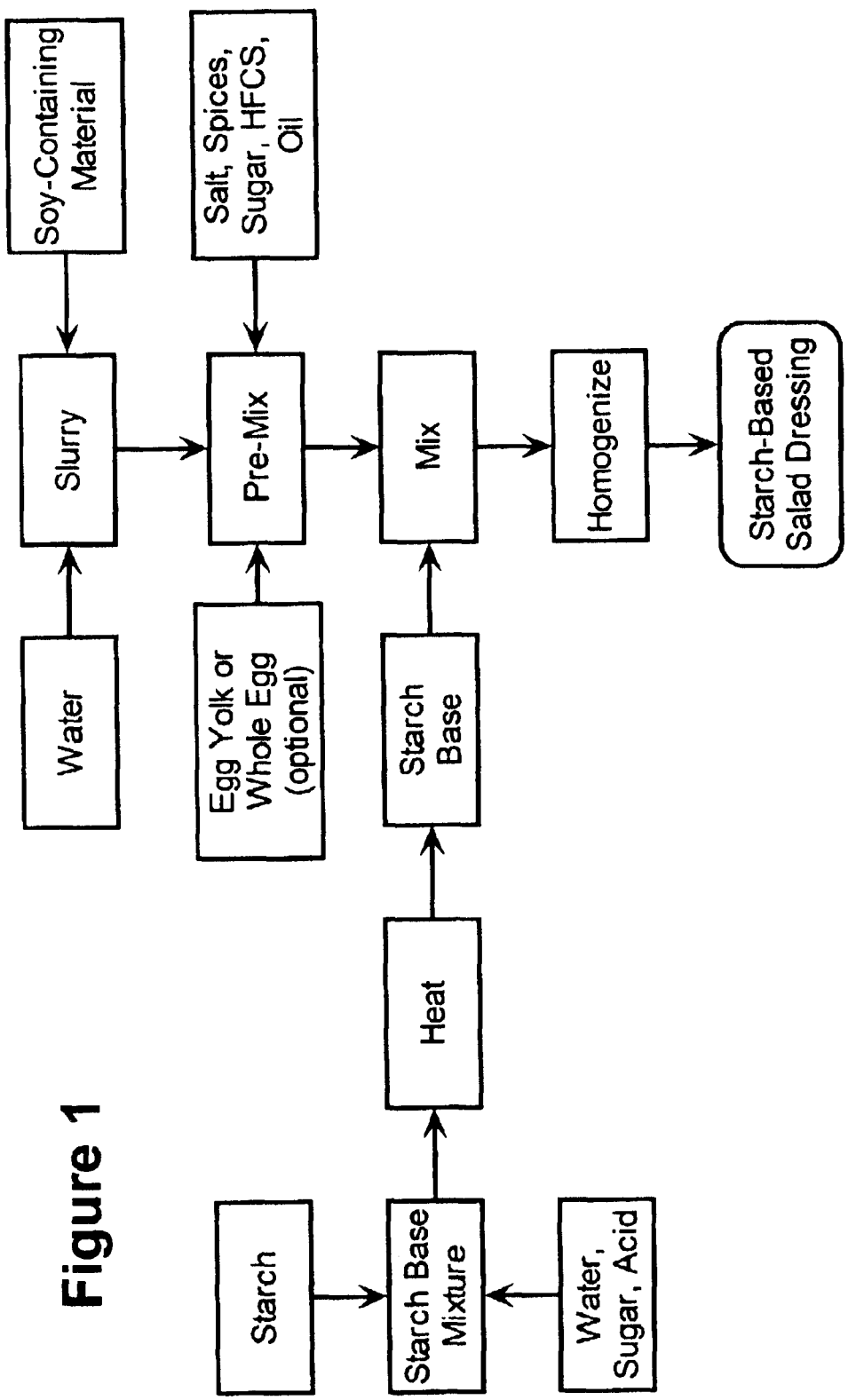
FIG. 1 is a flow chart generally illustrating the preparation of a soy-protein containing salad dressing using the method of the present invention.

The present invention relates to a starch-based salad dressing composition and a method for making such a salad dressing utilizing soy protein to replace a substantial amount (such as at least about 50 percent, preferably greater than about 60 percent, and more preferably greater than about 70 percent) of the egg yolk or whole egg. For purposes of the present invention, a "substantial amount" of egg yolk or whole egg is intended to include cases where at least about 50 percent, and more preferably about 50 to about 100 percent, of the egg yolk and/or whole egg is replaced by soy protein.

The use of soy protein in the present invention is not only beneficial to the consumer's health, but is also believed to be beneficial in the manufacturing of the salad dressing disclosed herein due to cost savings. Replacing a significant amount of the egg yolk or whole egg with soy protein in the manufacture of starch-based salad dressings provides a significant cost savings. The reduced-egg content salad dressings and egg content-free salad dressings of the present invention have the flavor, texture, and appearance of the conventional salad dressing. For purposes of this invention, "reduced-egg content salad dressings" are intended to include the egg content-free salad dressings wherein all the egg yolk and/or whole egg has been replaced by soy protein as well as salad dressings where at least about 50 percent of the egg yolk and/or whole egg has been replaced by soy protein.

Conventional salad dressings are oil-in-water (O/W) emulsions in which egg yolk or whole egg functions as emulsifiers. Some of these proteins are adsorbed at the O/W interface while the remaining protein forms the gel network in the continuous phase. According to the present invention, soy protein may also act as an emulsifier in starch-based salad dressings in place of the egg yolk or whole egg.

For purposes of the present invention, the term "soy protein" is intended to include any soy protein material, such as ground or whole soy beans, powdered or dried soy milk, soy meal, soy flour, soy protein concentrate, or soy protein isolate. Preferably soy flour is used in the present invention. Soy flour will generally have protein dispersibility indexes of about 30 to about 85 percent, preferably about 40 to about 75 percent, and more preferably about 50 to about 70 percent. The protein dispersibility index measures the amount of dispersible protein in soybean products using a standardized test of the American Oil Chemical Society (1987) (see also, Hsu et al., *J. Dairy Sci.*, 78, 1353 (1995)). The soy flour may be treated prior to incorporating it into the starch-based salad dressing to denature a substantial amount of the proteins and carbohydrates contained therein.

Soy flour generally contains about 50 percent protein and about 30 percent carbohydrate by weight. During the pretreatment process of the present invention, such as the initial heating step or enzyme treatment step as discussed later in detail, the carbohydrate component of the soy flour denatures and tends to gel. Likewise, the protein component also denatures or unfolds, which increases its emulsifying activity during the pretreatment phase. The gelatinized carbohydrate components form a firm gel network with the proteins in the continuous phase after homogenization and cooling during the process. Because of the enhancement of emulsifying and gelling activities of both the protein and carbohydrate components in the treated soy flour, less protein and starch are needed to obtain similar emulsion stability and gel firmness in the present compositions as compared to conventional products. The soy protein-containing starch-based salad dressings of the present invention are essentially free of beany or other off-flavors normally associated with soy protein-containing products. As a result, reduced-egg content or egg content-free salad dressings of the present invention can be made having the flavor, texture, and appearance of conventional egg-containing salad dressings.

In one embodiment of the present invention, the soy protein source is untreated soy flour. The soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to form the salad dressing composition.

FIG. 1 provides a flow chart generally depicting the preparation of a soy protein-containing starch-based salad dressing using the method of the present invention. A soy protein is dispersed in water to form a soy protein slurry. The soy protein is, preferably, a soy flour having a protein dispersiblity index of about 40 to about 75 percent, and more preferably, of about 50 to about 70 percent. The soy protein slurry is mixed with (for a reduced-egg content salad dressing) or without (for an egg content-free salad dressing) egg yolk and/or whole egg and with salt, spices, sugar, high fructose corn syrup, and soybean oil to make a premix. A starch base is prepared separately by mixing starch with water, sugar, and acid. The starch base mix is cooked at about 75 to about 100° C. (preferably about 80 to about 90° C.) for about 10 to about 90 minutes and cooled to room temperature to produce the starch base. The starch-based salad dressing is then prepared by mixing the premix and the starch base in a ratio of between about 45/55 to about 55/45 in a high shear mixer. The salad dressing is then placed into suitable product packages, which can be sealed for the retail or other market.

In another embodiment of the present invention, the pretreatment involves heating an aqueous slurry of the soy flour to a temperature of about 75 to about 100° C. (preferably about 80 top about 85° C.) for a time, generally about 1 to about 15 minutes, sufficient to denature a substantial amount of the proteins and carbohydrates (such as at least about 40 percent and at least about 50 percent, respectively), and then cooling the slurry. The treated soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to form the salad dressing composition.

Figure 2:
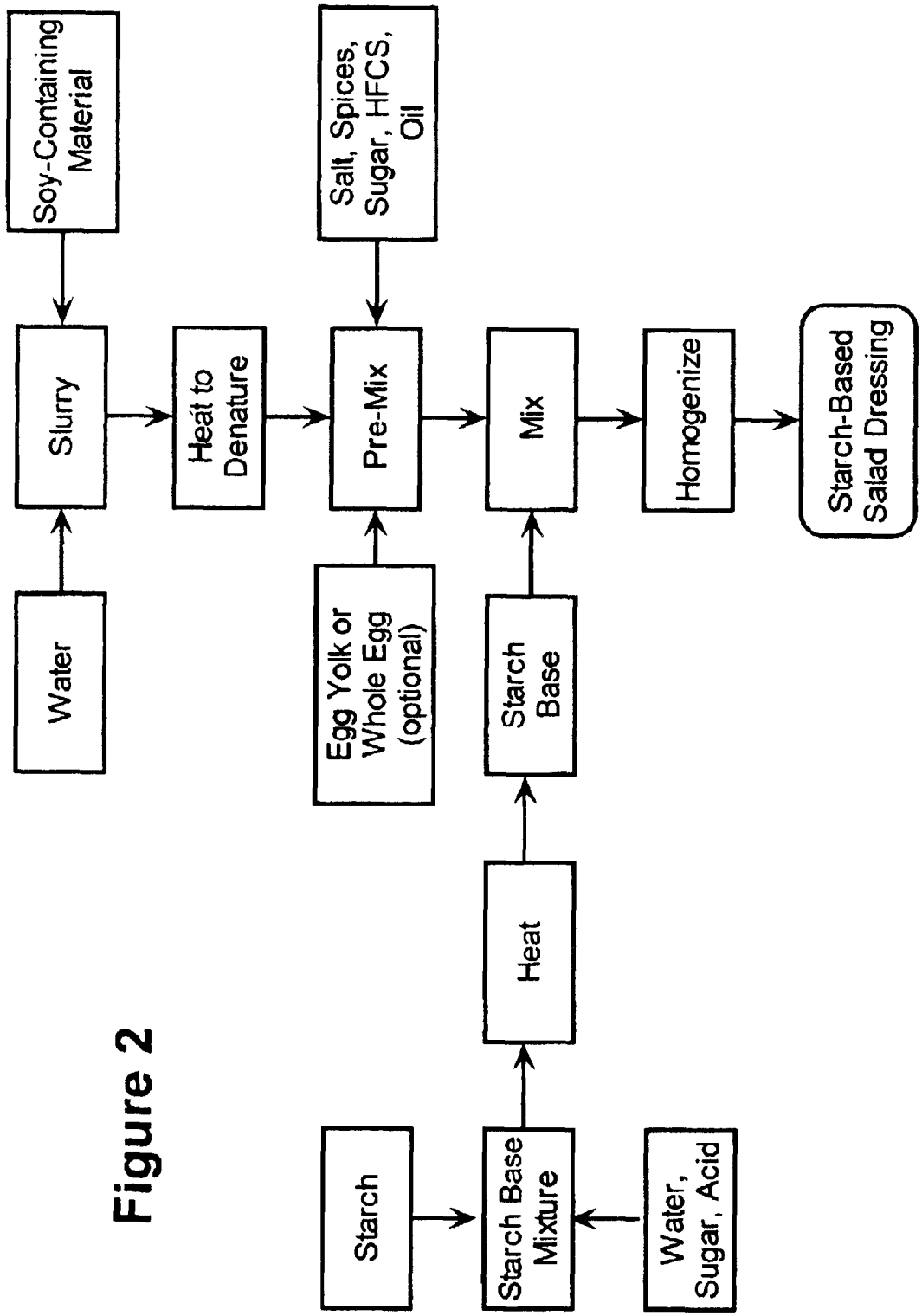
FIG. 2 is a flow chart generally illustrating the preparation of a soy protein-containing salad dressing using the method of the present invention whereby the proteins and carbohydrates are denatured using heat treatment.

FIG. 2 provides a flow chart generally illustrating the preparation of a soy protein-containing starch-based salad dressing using the method of the present invention whereby the proteins and carbohydrates are denatured using heat treatment. An aqueous slurry of a soy protein is heated to a temperature of about 75 to about 100° C. (preferably about 80 to about 85° C.) for a time sufficient to denature a substantial amount of the proteins and carbohydrates (such as at least about 40 percent and at least about 50 percent, respectively). The soy protein is, preferably, a soy flour having a protein dispersiblity index of about 40 to about 75 percent, and more preferably about 50 to about 70 percent. The slurry may then be allowed to cool. The heat-treated soy protein slurry is mixed with (for a reduced-egg content salad dressing) or without (for an egg content-free salad dressing) egg yolk and/or whole egg and with salt, spices, sugar, high fructose corn syrup, and soybean oil to make a premix. A starch base is prepared separately by mixing starch with water, sugar, and acid. The starch base mix is cooked at about 75 to about 100° C. (preferably to about 80 to about 90° C.) for about 10 to about 90 minutes and cooled to room temperature to produce the starch base. The starch-based salad dressing is then prepared by mixing the premix and the starch base in a ratio of between about 45/55 to about 55/45 in a high shear mixer. The salad dressing is then placed into product packages, which can be sealed for the retail or other market.

In another embodiment of the present invention, the soy flour is treated with an enzyme, such as a protease, followed by heat treatment to inactivate the enzyme and denature a substantial amount of the proteins and carbohydrates (such as at least about 40 percent and at least about 50 percent, respectively) contained therein. Suitable protease enzymes include, for example, bacterial proteases, fungal proteases, microbial proteases, trypsin, chytrpsin, pepsin, and the like. Specific examples of preferred enzymes include Corolase 7089 and Corolase PN-L from AB Enzyme (Somerset, N.J.). After the enzyme treatment, the soy/enzyme mixture is generally heated to about 80 to about 100° C. for about 3 to about 15 minutes to inactivate the enzyme and to denature the protein and carbohydrate contained therein. The treated soy flour is blended with or without a portion of egg yolk or whole egg and with salt, spices, sugar, high fructose corn syrup, and soybean oil to make a premix. The starch base is made separately from water, starch, sugar, and acid through cooking and cooling. The premix and starch base are then mixed and homogenized to form the salad dressing composition.

Figure 3:
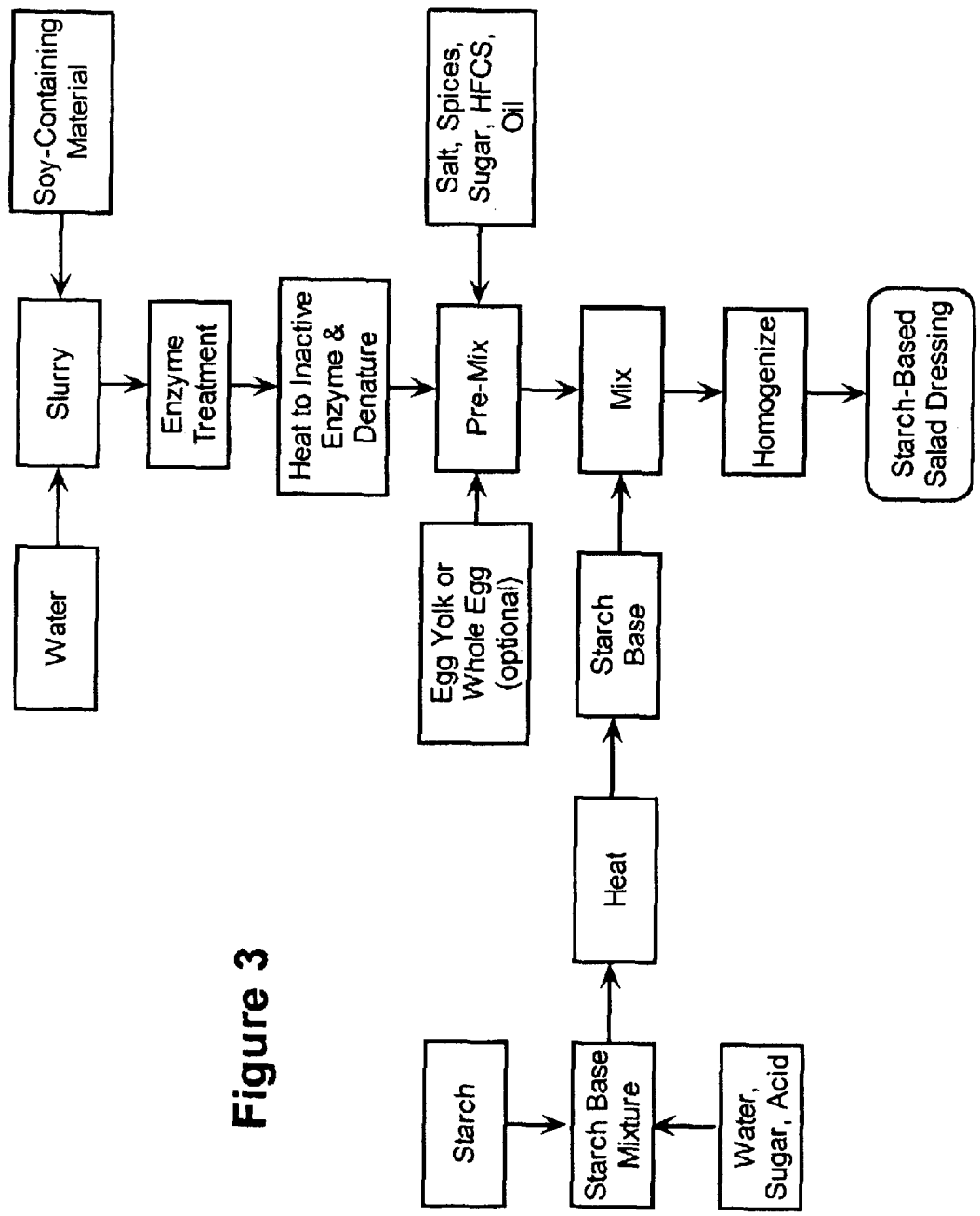
FIG. 3 is a flow chart generally illustrating the preparation of a soy protein-containing salad dressing using the method of the present invention whereby the proteins and carbohydrates are hydrolyzed and denatured using enzyme treatment.

FIG. 3 is a flow chart generally showing the preparation of a soy protein-containing starch-based salad dressing utilizing the method of the present invention whereby the proteins and carbohydrates are denatured using enzyme treatment. An aqueous slurry of soy protein is treated with an enzyme, such as a protease. The soy protein is, preferably, a soy flour having a protein dispersiblity index of about 40 to about 75 percent, and more preferably about 50 to about 70 percent. Suitable protease enzymes include, for example, bacterial proteases, fungal proteases, microbial proteases, trypsin, chytrpsin, pepsin, and the like. Specific examples of preferred enzymes include Corolase 7089 and Corolase PN-L from AB Enzyme. In an especially preferred embodiment, the soy flour dispersion is treated with about 0.10 to about 0.20 percent Corolase 7089 and about 0.05 to about 0.15 percent Corolase PN-L by weight of soy flour for about 10 to 40 minutes. After the enzyme treatment, the soy protein/enzyme mixture is generally heated to about 80 to about 100° C. for about 3 to about 15 minutes to inactivate the enzyme and to denature the proteins and carbohydrates contained therein (such as at least about 40 percent and at least about 50 percent, respectively). The slurry may then be cooled to room temperature. The enzyme-treated soy protein slurry is mixed with (for a reduced-egg content salad dressing) or without (for an egg-free salad dressing) egg yolk and/or whole egg and with salt, spices, sugar, high fructose corn syrup, and soybean oil to make a premix. A starch base is prepared separately by mixing starch with water, sugar, and acid. The starch base mix is cooked at about 75 to about 100° C. (preferably to about 80 to about 90° C.) for about 10 to about 90 minutes and cooled to room temperature to produce the starch base. The starch-based salad dressing is then prepared by mixing the premix and the starch base in a ratio of between about 45/55 to about 55/45 in a high shear mixer. The salad dressing is then placed into product packages, which can be sealed for the retail or other market.

In addition to the pretreatments of the soy flour set forth supra, the soy flour may be further treated prior to incorporation into the salad dressing with α-galactosidase to further covert raffinose and stachyose into simple sugars, thereby further minimizing any potential intestinal gas and flatulence caused by the salad dressing.

If so desired, the fiber in the soy flour may also be microfluidized to produce smaller fiber particles, thereby enhancing the "smoothness" and "creaminess" of the final salad dressing. Generally, microfluidized soy flour has an average particle size of about 2 to about 5 microns.

The soy flour may also be mixed with maltodextrin to form a composition to replace egg yolk or whole egg in starch-based salad dressings. In such cases, a ratio of soy flour to maltodextrin of about 2/1 to about 4/3 may be used.

The typical texture, solubility, and flavor problems associated with soy were not observed in the compositions of the present invention. Although the present invention should not be limited by theory, it is presumed that the present invention allows soy protein to interact with the starch base and oil coherently. This allows the starch base to coat the flavored components of the soy protein, thereby masking these components. Thus, the salad dressing of the present invention has essentially the same texture, emulsion stability, and flavor as conventional salad dressings. It is also believed that the starch in the salad dressing thickens the continuous phase of the emulsion. This allows the salad dressing to have great emulsion stability.

Those skilled in the art will recognize that modifications and variations may be made without departing from the true spirit and scope of the present invention. The present invention is, therefore, not to be limited to the embodiments described and illustrated, but is to be determined from the appended claims. Unless specified otherwise, all percentages and ratios are by weight. All patents and other publication cited herein are incorporated by reference.

EXAMPLE 1

In order to determine the emulsifying values of soy flour, soy protein concentrate, and soy protein isolate, each one was tested in a model emulsion system. The specific formulations of Formulas 1 (control) and 2 (inventive sample) are presented in Table 1.

TABLE 1

| Ingredient | Formula 1 (%) | Formula 2 (%) |
|---|---|---|
| Water | 36.5 | 38.8–39.1 |
| Soybean oil | 32 | 32 |
| High fructose corn syrup | 7 | 7 |
| Acid | 7 | 7 |
| Egg yolk/whole egg | 6 | 3 |
| Sugar | 5 | 5 |
| Starch | 4 | 4 |
| Salt | 2 | 2 |
| Spices | 0.5 | 0.5 |
| Soy protein | 0 | 0.4–0.7 |

Soy flour, soy protein concentrate, and soy protein isolate were evaluated at a 32 percent soy bean oil level on a bench top scale (1 kg) using Formulas 1 and 2. These samples were also compared to a commercial salad dressing (i.e., Kraft MIRACLE WHIP™). Three inventive samples were prepared wherein about half of the normal egg yolk/whole egg was replaced with soy protein isolate: (1) a product containing 3 percent egg yolk/whole egg product and 0.68–0.72 percent soy flour; (2) a product containing 3 percent egg yolk/whole egg and 0.51–0.55 percent soy protein concentrate; and (3) a product containing 3 percent egg yolk/whole egg and 0.40–0.42 percent soy protein isolate. The soy flours used in these tests were AFLUFF-200W defatted soy flour (Central Soy Co., Fort Wayne, Ind.), Bakers NUTRISOY™ 063-100 defatted soy flour (Archer Daniels Midland "ADM", Decatur, Ill.), and 200/70 defatted soy flour (Cargill, Cedar Rapids, Iowa). The soy protein concentrate used in these tests was ADM ARCON® SM 066-405 and the soy protein isolate used was ADM PRO FAM® 891.

The tests surprising showed that soy flour, soy protein concentrate, and soy protein isolate gave emulsion drop size distributions and rheology very similar to those of the control. Overall, soy flour was preferred because it was the least expensive. Hence, soy flour was used in the remaining pilot test plant trials for 50–100 percent egg yolk and whole egg replacement in the starch-based salad dressing.

EXAMPLE 2

Commercially available soy flours were evaluated for use in the present invention. Three soy flours from ADM (Toasted NUTRISOY™ 063-160, Bakers NUTRISOY™ 063-100, and NUTRISOY™ 7B 063-130) and three soy flours from Cargill (Nos. 200/20, 200/70, and 100/90) were tested.

Protein dispersibility indexes (PDI) were provided by the suppliers. PDI provides an estimate of the degree of dispersed protein in the soy protein material. The tested soy flours had the following PDIs:

| Sample | PDI (%) |
| --- | --- |
| ADM 063-160 | 25 |
| Cargill 200/20 | 20 |
| ADM 063-100 | 60 |
| Cargill 200/70 | 70 |
| ADM 063-130 | 90 |
| Cargill 100/90 | 90 |

During the salad dressing manufacturing process, it is preferred that the protein mix have a low or modest viscosity prior to acidification, but a high viscosity after acidification (i.e., during the mixing of the premix and starch base). Soy flours may be prepared under a variety of conditions. For example, they may be water washed or solvent/water washed and/or dried at different temperatures for different times. As a result, different soy flours may have different functional characteristics, such as different viscosities, as well as different flavors, colors, and odors. Flavor directly influences consumer acceptance, while an appropriate viscosity of the soy flour is required to provide the "body," or thickness, of the salad dressing emulsion. Therefore, evaluation of soy flour from available sources is important for the selection of the appropriate soy flour to manufacture an optimal salad dressing. It is ideal that the soy flour used in the salad dressing composition of the present invention have a low soy flavor with most indigenous enzymes inactivated and moderate viscosity. Optimally, the soy flour has a greater viscosity after its pH is lowered.

For this evaluation, soy flour was dispersed in water at 20 percent. Viscosity of each sample was measured with a Brookfield Viscometer (Model DV-II+, spindle RV2 or RV3). Viscosity change was followed for approximately 4 hours. The samples were then heated in a boiling water bath. Viscosity was measured after the sample cooled to room temperature. After that, the pH of each sample was adjusted by adding acids (acetic acid, lactic acid, and water in a 1:2:2 ratio). The viscosity at different pH points was measured by the viscometer.

In a second evaluation, the soy flour was dispersed in water at 20 percent. Twenty-four hours later, the pH of each sample was adjusted by adding acid, the samples were heated in a boiling water bath, and the samples were cooled to room temperature. The viscosity at different times and pH points were measured by the viscometer.

The viscosity tests showed that ADM 063-100 soy flour maintained good viscosity at the lower pH values of the production process for the salad dressing.

A flavor mapping test of four of the six soy flours with less flavor and enzyme activity, ADM 063-160, ADM 063-100, Cargill 200/70, and Cargill 200/20, was also conducted. The four soy flours were analyzed using a purge/trap gas chromatography olfactometry technique to determine their flavor profile. Among these four soy flours, ADM 063-100 was shown to have the lowest off-flavor and the lowest odor intensities.

Therefore, based on the results of these tests, ADM 063-100 was determined to be the most suitable soy flour and was used in the preparation of samples in the following examples, along with occasional use of ADM 063-160.

EXAMPLE 3

In order to determine if heat treatment and enzyme treatment enhanced the functionality of the soy flour, the soy flour was treated with heating or in situ controlled enzyme hydrolysis and then evaluated after incorporation into the starch-based salad dressing.

Soy flour treated with heat and soy flour treated with controlled enzyme hydrolysis were evaluated at pilot plant scale (180 lb.) at both 32 percent and 25 percent soy bean oil levels using Formula 2 (see Table 1 above) and Formulas 3, 5, and 6 (see Table 2 below). Control samples having Formulas 1 and 4 were also prepared for purposes of comparison. The specific formulations of Formulas 1 and 2 are presented in Table 1 above and the specific formulations of Formulas 3, 4, 5, and 6 are noted in Table 2 below.

TABLE 2

| Ingredient | Formula 3 (%) | Formula 4 (%) | Formula 5 (%) | Formula 6 (%) |
| --- | --- | --- | --- | --- |
| Water | 41 | 42 | 44.5 | 47 |
| Soybean oil | 32 | 25 | 25 | 25 |
| High fructose corn syrup | 7 | 7 | 7 | 7 |
| Acid | 7 | 6.5 | 6.5 | 6.5 |
| Egg yolk/whole egg | 0 | 7 | 3.5 | 0 |
| Sugar | 5 | 5 | 5 | 5 |
| Starch | 4 | 5 | 5 | 5 |
| Salt | 2 | 2 | 2 | 2 |
| Spices | 0.5 | 0.5 | 0.5 | 0.5 |
| Soy protein | 1.5 | 0 | 1 | 2 |

These products were also compared with a commercial salad dressing (i.e., Kraft MIRACLE WHIP™.)

To heat-treat soy flour, the soy flour was dispersed in water and heated to 80 to 90° C. The dispersion was cooled to room temperature. To subject the soy flour to enzyme treatment, the soy flour was initially dispersed in water. The slurry was then heated to 40 to 60° C. and hydrolyzed with enzymes. The enzyme treatment composition contained about 0.10 to about 0.20 percent Corolase 7089 and about 0.05 to about 0.15 percent Corolase PN-L by weight of soy flour. The slurry was treated with the enzymes for 10 to 40 minutes and then heated to 80 to 90° C. The slurry was then allowed to cool to room temperature. The heat and enzyme treated soy flour samples were incorporated into salad dressing and the yield stress and viscosity of the salad dressing were analyzed.

Both heat treatment and enzymatic hydrolysis of the soy flour increased the yield stress value and viscosity of the salad dressing. As a result, the tests showed that less soy flour could be used while maintaining the same rheology of the conventional salad dressing.

EXAMPLE 4

An evaluation of salad dressings made using treated and untreated soy flour were also undertaken to evaluate the effects of treatment on the characteristics of the soy flour. To this end, the particle size and shelf life of salad dressing samples containing treated and untreated soy flour were evaluated.

Salad dressings made from the soy flour and heat-treated soy flour resulted in essentially the same particle size as the control samples and a commercial salad dressing (i.e., Kraft MIRACLE WHIP™). This indicated that the soy flour-containing dressings would have a mouthfeel similar to conventional salad dressings.

A shelf life study of the salad dressings was also conducted. Over the shelf life study, the emulsion drop size and yield stress value of the salad dressing samples prepared with the heat-treated soy flour remained unchanged over time. In contrast, the emulsion drop size of the non-heat-treated samples became larger and its yield stress value slightly reduced after over a month of storage. These results demonstrated that heat treatment enhances the emulsion stability of the soy flour in the starch-based salad dressing.

EXAMPLE 5

Starch-based salad dressing samples were prepared with both 50 percent and 100 percent replacement of egg yolk/whole egg with soy flour using Formulas 2, 3, 5, and 6. Control samples were also prepared according to Formulas 1 and 4.

At a 32 percent soy bean oil level, pilot plant scale (180 lb.) experiments were conducted using Formulas 1–3 for control, 50 percent, and 100 percent egg product replacement with soy flour or treated soy flour. The dispersion of soy flour or treated soy flour was mixed with (for 50 percent replacement) or without (for 100 percent replacement) egg yolk or whole egg and with salt, spices, sugar, high fructose corn syrup, and soy bean oil to make a premix. The starch base was made separately from water, starch, sugar, and acid. The starch base was cooked at about 80 to about 90° C. for about 10 to 90 minutes and cooled to room temperature. The salad dressing was prepared by mixing the premix and the starch base in a ratio of between about 45/55 to about 55/45 in a high shear short time (HSST) homogenizer.

Pilot plant trials using a 25 percent soy bean oil level to test 50 percent and 100 percent egg replacement with soy flour or treated soy flour were conducted according to Formulas 4–6. The dispersion of soy flour or treated soy flour was mixed with (for 50 percent replacement) or without (for 100 percent replacement) egg yolk or whole egg and with salt, spices, sugar, high fructose corn syrup, and soy bean oil to make a premix. The starch base was made separately from water, starch, sugar, and acid. The starch base was cooked at about 80 to about 90° C. for about 10 to 90 minutes and cooled to room temperature. The salad dressing was prepared by mixing the premix and the starch base in a ratio of between about 45/55 to about 55/45 in a high shear short time (HSST) homogenizer.

These products were also compared Kraft MIRACLE WHIP™ salad dressing produced in parallel pilot plant trials.

These samples were found to have essentially the same rheology and emulsion stability as the control Formulas 1 and 4, based on the rheological and ultracentrifugation results. In terms of flavor and mouthfeel, the 50 percent soy flour-containing salad dressing sample was slightly preferred over the 100 percent soy flour-containing salad dressing sample according to an informal taste panel. Nevertheless, no beany or other off flavors were detected in either case and both the 50 percent and 100 percent replacement samples were considered as acceptable salad dressings.

EXAMPLE 6

The inventive salad dressing samples of Example 5 were analyzed and compared to both control samples, which were prepared in the same general manner but does not have any replacement of the egg yolk or whole egg with soy flour. The samples were subjected to ultracentrifugation at 100,000 time gravity for 30 minutes at 25° C. to evaluate stability. Ultracentrifugation results showed that the soy flour-containing starch-based salad dressing had essentially the same emulsion stability as the control sample. Noticeably, none of the salad dressing samples underwent oil separation, indicating that the salad dressing emulsions are very stable against accelerated aging.

EXAMPLE 7

A salad dressing having a portion of the egg yolk or whole egg replaced with a combination of soy flour and maltodextrin was also evaluated. The emulsion drop size, yield stress, and viscosity of this salad dressing were examined.

The samples were prepared according to Formula 7 and the resulting salad dressing was compared to the samples prepared in the examples discussed above. Samples containing 0.50 percent and 0.75 percent maltodextrin were prepared in combination with ADM 063-100 or ADM 063-160 soy flour. Formula 7 is presented in Table 3.

TABLE 3

| Ingredient | Formula 7 (%) |
| --- | --- |
| Water | 43.75–44 |
| Soybean oil | 25 |
| High fructose corn syrup | 7 |
| Acid | 6.5 |
| Egg yolk/whole egg | 3.5 |
| Sugar | 5 |
| Starch | 5 |
| Salt | 2 |
| Spices | 0.5 |
| Maltodextrin | 0.5–0.75 |
| Soy protein | 1 |

The results of these tests showed that a combination of soy flour and maltodextrin also functions efficiently as a replacement emulsifier for egg yolk or whole egg. The sample viscosity and emulsion drop size of the maltodextrin-containing samples were similar to those of the soy-containing samples discussed above. Ultracentrifugation tests of these samples also showed no oil separation, indicating that the emulsions formed were stable.

What is claimed is:

1. A method for making a salad dressing composition comprising:
    (a) providing an aqueous slurry of a soy protein-containing material;
    (b) mixing the slurry with salt, spices, sugar, high fructose corn syrup, and oil to form a premix;
    (c) mixing water, starch, sugar, and acid to form a starch base;
    (d) heating the starch base;
    (e) mixing the premix and starch base; and
    (f) homogenizing the premix and starch base to form the salad dressing composition.

2. The method according to claim 1, wherein the soy protein-containing material is a soy flour.

3. The method according to claim 2, wherein the soy flour has a dispersibility index of about 40 to about 75 percent.

4. The method according to claim 3, wherein the soy flour has a dispersibility index of about 50 to about 70 percent.

5. The method according to claim 1, wherein step (a) further comprises heating the aqueous slurry of the soy protein-containing material at a temperature and for a time sufficient to denature a substantial amount of proteins and carbohydrates contained in the soy protein-containing material.

6. The method according to claim 5, wherein the temperature is about 75 to about 100° C.

7. The method according to claim 6, wherein the substantial amount of proteins and carbohydrates denatured is at least about 40 percent and at least about 50 percent, respectively.

8. The method according to claim 1, wherein step (a) further comprises treating the aqueous slurry of the soy protein-containing material with an enzyme and heating the enzyme-treated soy protein-containing material to inactivate the enzyme and at a temperature and for a time sufficient to denature a substantial amount of proteins and carbohydrates contained in the soy protein-containing material.

9. The method according to claim 8, wherein the protease is selected from the group consisting of microbial proteases, trypsin, chymotrypsin, pepsin, and mixtures thereof.

10. The method according to claim 9, wherein the protease is selected from a group consisting of bacterial proteases, fungal proteases, microbial proteases, trypsin, chytrpsin, pepsin, and mixtures thereof.

11. The method according to claim 9, wherein the temperature is about 80 to about 100° C.

12. The method according to claim 9, wherein the substantial amount of proteins and carbohydrates denatured is at least about 40 percent and at least about 50 percent, respectively.

13. The method according to claim 1, wherein the temperature of step (d) is about 75 to about 100° C.

14. The method according to claim 1, wherein the ratio of premix to starch base in step (e) is between about 45/55 and about 55/45.

15. The method according to claim 1, wherein the soy protein-containing material has been treated with α-galactosidase.

16. The method according to claim 1, wherein the soy protein-containing material has been microfluidized.

17. The method according to claim 1, wherein the slurry is mixed with maltodextrin in step (b).

18. The method according to claim 9, wherein the microbial protease is selected from the group consisting of bacterial proteases and fungal proteases.

19. A salad dressing comprising:
   a premix comprising a soy protein-containing material, salt, spices, sugar, high fructose corn syrup, and oil; and
   a starch base comprising water, starch, sugar, and acid;
   wherein the premix and the starch base have been mixed to form an emulsion and wherein the soy protein acts as an emulsifier.

20. The salad dressing composition according to claim 19, wherein the premix further comprises egg yolk, whole egg, or a mixture thereof.

21. The salad dressing composition according to claim 19, wherein the salad dressing composition contains essentially no egg yolk or whole egg.

22. The salad dressing composition according to claim 19, wherein the soy protein-containing material is a soy flour.

23. The salad dressing composition according to claim 20, wherein the soy protein-containing material is a soy flour.

24. The salad dressing composition according to claim 21, wherein the soy protein-containing material is a soy flour.

25. The salad dressing composition according to claim 19, wherein the soy flour has a dispersibility index of about 40 to about 75 percent.

26. The salad dressing composition according to claim 19, wherein the soy protein-containing material is obtained by treatment of a starting soy protein-containing material in order to denature a substantial amount of the proteins and carbohydrates containing in the soy flour.

27. The salad dressing composition according to claim 20, wherein the soy protein-containing material is obtained by treatment of a starting soy protein-containing material in order to denature a substantial amount of the proteins and carbohydrates containing in the soy flour.

28. The salad dressing composition according to claim 21, wherein the soy protein-containing material is obtained by treatment of a starting soy protein-containing material in order to denature a substantial amount of the proteins and carbohydrates containing in the soy flour.

29. The salad dressing composition according to claim 20, wherein the treatment comprises heating an aqueous slurry of the starting soy protein-containing material to a temperature of about 75 to about 100° C.

30. The salad dressing composition according to claim 21, wherein the treatment comprises heating an aqueous slurry of the starting soy protein-containing material to a temperature of about 75 to about 100° C.

31. The salad dressing composition according to claim 29, wherein the substantial amount of proteins and carbohydrates denatured is at least about 40 percent and at least about 50 percent, respectively.

32. The salad dressing composition according to claim 30, wherein the substantial amount of proteins and carbohydrates denatured is at least about 40 percent and at least about 50 percent, respectively.

33. The salad dressing composition according to claim 27, wherein the treatment comprises treating an aqueous slurry of the starting soy protein-containing material with an enzyme and then heat treating the enzyme-treated soy protein-containing material to inactivate the enzyme.

34. The salad dressing composition according to claim 28, wherein the treatment comprises treating an aqueous slurry of the starting soy protein-containing material with an enzyme and then heat treating the enzyme-treated soy protein-containing material to inactivate the enzyme.

35. The salad dressing composition according to claim 33, wherein the enzyme is a protease.

36. The salad dressing composition according to claim 34, wherein the enzyme is a protease.

37. The salad dressing composition according to claim 35, wherein the protease is selected from the group consisting of microbial proteases, trypsin, chymotrypsin, pepsin, and mixtures thereof.

38. The salad dressing composition according to claim 36, wherein the protease is selected from the group consisting of microbial proteases, trypsin, chymotrypsin, pepsin, and mixtures thereof.

39. The salad dressing composition according to claim 35, wherein the substantial amount of proteins and carbohydrates denatured is at least about 40 percent and at least about 50 percent, respectively.

40. The salad dressing composition according to claim 36, wherein the substantial amount of proteins and carbohydrates denatured is at least about 40 percent and at least about 50 percent, respectively.

41. The salad dressing composition according to claim 19, wherein the premix and starch base have been homogenized.

42. The salad dressing composition according to claim 19, wherein the ratio of premix to starch base is between about 45/55 and about 55/45.

43. The salad dressing composition according to claim 19, wherein the soy protein-containing material has been treated with α-galactosidase.

44. The salad dressing composition according to claim 19, wherein the soy protein-containing material has been microfluidized.

45. The salad dressing composition according to claim 19, wherein the premix further comprises maltodextrin.

46. The salad dressing composition according to claim 45, wherein the ratio of soy protein-containing material to maltodextrin is between about 4/3 to about 2/1.

47. The salad dressing composition according to claim 37, wherein the microbial protease is selected from the group consisting of bacterial proteases and fungal proteases.

48. The salad dressing composition according to claim 38, wherein the microbial protease is selected from the group consisting of bacterial proteases and fungal proteases.

* * * * *

UNITED STATES PATENT AND TRADEMARK OFFICE
CERTIFICATE OF CORRECTION

PATENT NO. : 6,849,282 B2
DATED : February 1, 2005
INVENTOR(S) : Gao et al.

It is certified that error appears in the above-identified patent and that said Letters Patent is hereby corrected as shown below:

Title page,
Item [75], Inventors, after "Gao," delete "Glenview, IL (US)", and insert -- Lansdale, PA (US) --.

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,849,282 B2 | Page 1 of 1 |
| APPLICATION NO. | : 10/358912 | |
| DATED | : February 1, 2005 | |
| INVENTOR(S) | : Gao et al. | |

It is certified that error appears in the above-identified patent and that said Letters Patent is hereby corrected as shown below:

In Claim 9, Col. 13, Lines 2-3, delete "is selected from the group consisting of microbial proteases, trypsin, chymotrypsin, pepsin, and mixtures thereof" and after "wherein the", insert -- enzyme is a --;

In Claim 10, Col. 13, Line 5, after "from" delete "a" and insert -- the --;

In Claim 10, Col, 13, Line 5-6, after "consisting of" delete "bacterial proteases, fungal proteases,";

In Claim 10, Col. 13, Line 7, before "pepsin" delete "chytrpsin" and insert -- chymotrypsin --; and In Claim 18, Col. 13, Line 25, after "claim" delete "9" and insert -- 10 --.

Signed and Sealed this

Seventh Day of August, 2007

JON W. DUDAS
*Director of the United States Patent and Trademark Office*